(12) United States Patent
Koyanagi (10) Patent No.: US 10,377,060 B2
(45) Date of Patent: Aug. 13, 2019

(54) MOLD, TIRE CURING MOLD, AND METHOD FOR MANUFACTURING MOLD

(71) Applicant: BRIDGESTONE CORPORATION, Tokyo (JP)

(72) Inventor: Tomo Koyanagi, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 161 days.

(21) Appl. No.: 15/125,885

(22) PCT Filed: May 26, 2015

(86) PCT No.: PCT/JP2015/065057
§ 371 (c)(1),
(2) Date: Sep. 13, 2016

(87) PCT Pub. No.: WO2015/182590
PCT Pub. Date: Dec. 3, 2015

(65) Prior Publication Data
US 2017/0001340 A1    Jan. 5, 2017

(30) Foreign Application Priority Data

May 27, 2014  (JP) ................................ 2014-109458
May 27, 2014  (JP) ................................ 2014-109514

(51) Int. Cl.
*B29C 33/02*    (2006.01)
*B29D 30/06*    (2006.01)
(Continued)

(52) U.S. Cl.
CPC ............ *B29C 35/02* (2013.01); *B22F 3/1055* (2013.01); *B29C 33/3828* (2013.01);
(Continued)

(58) Field of Classification Search
CPC ..... B29C 33/02; B29C 33/38; B29C 33/3828; B29C 2033/023; B29D 30/0606; B29D 30/0629; B29D 30/0662
See application file for complete search history.

(56) References Cited

U.S. PATENT DOCUMENTS

| 4,568,259 A | 2/1986 | Mattson |
| 5,775,402 A * | 7/1998 | Sachs ................. B22C 9/065 164/4.1 |

(Continued)

FOREIGN PATENT DOCUMENTS

| CN | 101511557 A | 8/2009 |
| EP | 2000290 A1 | 12/2008 |

(Continued)

OTHER PUBLICATIONS

Nov. 29, 2016 International Preliminary Report on Patentability issued in International Patent Application No. PCT/JP2015/065057.

(Continued)

*Primary Examiner* — James P Mackey
(74) *Attorney, Agent, or Firm* — Oliff PLC (57) ABSTRACT

A mold capable of imparting an appropriate amount of heat depending on a part of an object to be heated, the mold for transferring heat to the object to be heated is provided with a hollow portion inside the mold, and a heat amount adjusting agent, which is accommodated in the hollow portion, for changing heat transfer property of the hollow portion, in which the heat amount adjusting agent is made of a powdery or granular material having a material property different from a material property of the mold.

13 Claims, 6 Drawing Sheets

(51) Int. Cl.
  *B29C 35/02* (2006.01)
  *B33Y 80/00* (2015.01)
  *B33Y 10/00* (2015.01)
  *B29D 30/08* (2006.01)
  *B22F 3/105* (2006.01)
  *B29C 33/38* (2006.01)
  *B29C 35/08* (2006.01)
  *B29C 33/04* (2006.01)

(52) U.S. Cl.
  CPC .............. *B29D 30/08* (2013.01); *B33Y 10/00* (2014.12); *B33Y 80/00* (2014.12); *B29C 33/02* (2013.01); *B29C 33/04* (2013.01); *B29C 33/048* (2013.01); *B29C 2033/023* (2013.01); *B29C 2035/0838* (2013.01); *B29D 30/0606* (2013.01); *B29D 30/0662* (2013.01); *B29K 2995/0015* (2013.01)

(56) References Cited

U.S. PATENT DOCUMENTS

| | | | |
|---|---|---|---|
| 5,866,171 | A | 2/1999 | Kata |
| 6,112,804 | A | 9/2000 | Sachs et al. |
| 8,662,871 | B2 * | 3/2014 | Takagi ................ B29C 33/04 |
| | | | 425/36 |
| 2002/0074479 | A1 | 6/2002 | Frul |
| 2009/0308861 | A1 | 12/2009 | Okada et al. |
| 2012/0263813 | A1 * | 10/2012 | Takagi ................ B29C 33/04 |
| | | | 425/28.1 |

FOREIGN PATENT DOCUMENTS

| | | |
|---|---|---|
| JP | S52-117383 A | 10/1977 |
| JP | S59-142127 A | 8/1984 |
| JP | S62-33610 A | 2/1987 |
| JP | H01-80306 U | 5/1989 |
| JP | H11-515058 A | 12/1999 |
| JP | 2001-347527 A | 12/2001 |
| JP | 2005-074748 A | 3/2005 |
| JP | 2006-035615 A | 2/2006 |
| JP | 2009-091166 A | 4/2009 |
| JP | 4382673 B2 | 12/2009 |
| JP | 2010-121187 A | 6/2010 |
| JP | 2011-230331 A | 11/2011 |
| WO | 2011/077844 A1 | 6/2011 |
| WO | 2013/127655 A1 | 9/2013 |

OTHER PUBLICATIONS

Mar. 3, 2017 Extended Search Report issued in EP Patent Application No. 15800265.9.
Sep. 1, 2015 International Search Report issued in International Patent Application No. PCT/JP2015/065057.

* cited by examiner

MOLD, TIRE CURING MOLD, AND METHOD FOR MANUFACTURING MOLD

TECHNICAL FIELD

The present invention relates to a mold and, in particular, to a mold capable of giving appropriate amounts of heat to different regions of an object to be heated, a tire curing mold, and a method for manufacturing these molds.

BACKGROUND ART

Conventionally, a tire curing mold, which is one example of molds, includes side molds for enclosing both side regions of an uncured tire, which is an object to be heated, and a plurality of crown molds for enclosing the crown region of the uncured tire. The tire curing mold performs the heating and curing of the uncured tire by transferring heat supplied from the outside to the uncured tire. Also, the amount of heat given to the uncured tire from each of the molds depends on the heat transfer rate of the metal, which is the material used for the molds. Thus, the amount of heat given to the uncured tire is nearly the same irrespective of the different regions of the tire.

Figure 12A:
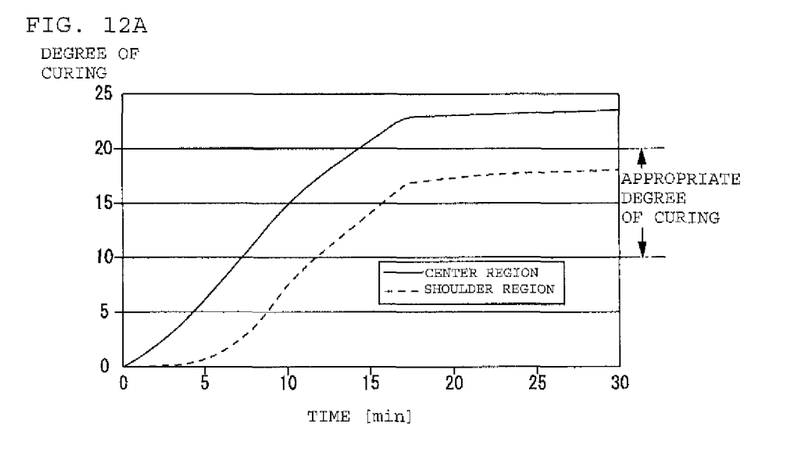
FIG. 12 is graphs showing temporal change in the degree of curing.

FIG. 12A is a graph showing temporal changes in the degree of curing in the vicinity of center area and the vicinity of shoulder areas of the crown region of the tire cured with the tire curing mold capable of giving a uniform amount of heat to different regions of the uncured tire. As shown in the figure, due to the difference in gauge thickness, the degree of curing (vulcanization) in the vicinity of center area with a thinner gauge thickness rises faster than in the vicinity of shoulder areas with a thicker gauge thickness. At the point when the degree of curing in the vicinity of shoulder areas with the thicker gauge thickness reaches a proper level, the degree of curing in the vicinity of center area tends to exceed the proper level and thus render an overcuring there. Therefore, it is difficult to achieve an optimum degree of curing in both the vicinity of center area and the vicinity of shoulder areas at the same time.

RELATED ART DOCUMENT

Patent Document

Patent Document 1: Japanese Patent No. 4382673

SUMMARY OF THE INVENTION

Problem to be Solved by the Invention

The present invention has been made in view of the foregoing problems, and an object of the invention is to provide a mold capable of giving appropriate amounts of heat depending on a part of an object to be heated.

Means for Solving the Problem

To solve the above-mentioned problem, the mold for giving heat to an object to be heated is so configured as to have a hollow portion therein and a heat amount adjusting agent held inside the hollow portion for changing the heat transfer property of the hollow portion. And the heat amount adjusting agent is made of a powdery or granular material which has material properties different from those of the mold.

It should be noted that the foregoing summary of the invention does not necessarily recite all the features essential to the invention. Therefore, it is to be understood that the subcombinations of these features also fall within the scope of the invention.

MODE FOR CARRYING OUT THE INVENTION

The invention will now be described in detail based on embodiments which do not intend to limit the scope of the claims of the present invention but exemplify the invention. All of the features and the combinations thereof described in the embodiments are not necessarily essential to the invention.

First Embodiment

Figure 1:
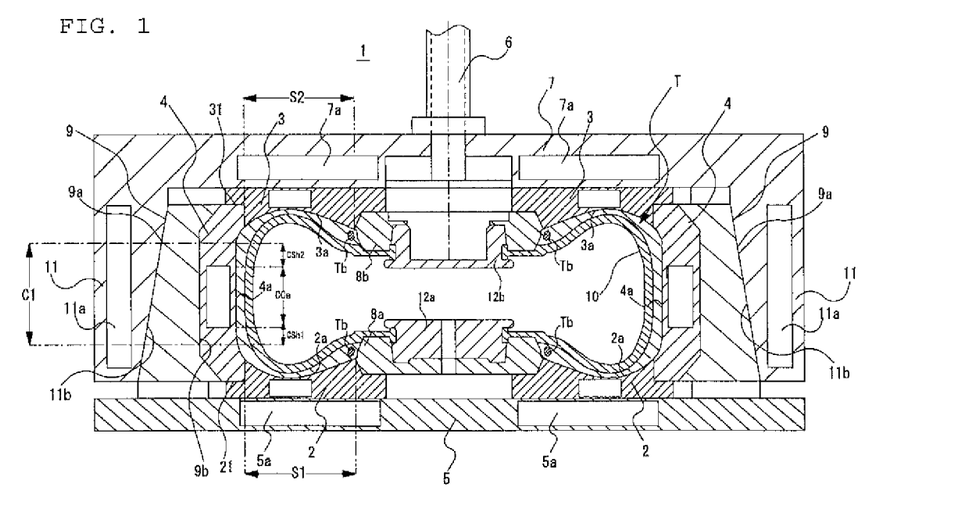
FIG. 1 is a schematic cross section showing a curing apparatus.

FIG. 1 is a schematic cross section of a curing apparatus 1. As shown in the figure, a curing apparatus 1 includes a side mold 2, which molds and cures one side region S1 of an uncured tire ((hereinafter referred to simply as "tire") T, as an object to be heated, placed horizontally on its side with the central axis of rotation extending vertically, and a side mold 3, which molds and cures the other side region S2 of the tire T, placed opposite to the lower side mold 2. Also, the curing apparatus 1 includes a plurality of sector molds 4 for molding and curing the crown region C1 of the tire T, which are arranged annularly along the crown region C1 between the side molds 2 and 3.

The tire T is, for instance, an uncured tire molded on a not-shown tire molding drum. The tire T is constituted by such not-shown component members as a carcass extending toroidally astride a pair of bead regions Tb, Tb disposed vertically apart from each other within the curing apparatus 1, a plurality of belts stacked on the carcass and a tread rubber in the crown region C1, and side rubbers disposed on the carcass in the side regions S1, S2.

The side mold 2 is a disk-shaped mold with an open central section. The side mold 2 molds the surface of the side region S1 with the molding surface 2a in contact with the side region S1 extending from the vicinity of one of the bead regions Tb, Tb toward the crown region C1 with the tire T placed in position. Also, the side mold 2 is placed on a base 5 which has a heating chamber 5a therein. The heating chamber 5a is an annular flow channel formed in the base 5 in such a manner as to be opposite to the outer periphery of the side mold 2. As will be described in detail later, a heating medium is supplied into the heating chamber 5a from a not-shown heat source supply unit. The heat produced by the heating medium is transferred to the side region S1 via the side mold 2. The open section of the side mold 2 is closed by a bead ring 8a, which molds the periphery of one of the bead regions Tb, Tb, and a clamp ring 12a, which holds the bladder 10 to be discussed later.

The side mold 3, in the same way as the side mold 2, is a disk-shaped mold with an open central section. The side mold 2 molds the surface of the side region S2 with the molding surface 3a in contact with the side region S2 extending from the vicinity of the other of the bead regions Tb, Tb toward the crown region C1 with the tire T placed in position. The side mold 3 is placed below the lower face of an outer ring 7 which rises and lowers along with the up-and-down movement of a center post 6. Provided inside the outer ring 7 is a heating chamber 7a. The heating chamber 7a is an annular flow channel formed inside the outer ring 7 in such a manner as to be opposite to the outer periphery of the side mold 3. A heating medium is supplied into the heating chamber 7a from a not-shown heat source supply unit, as with the heating chamber 5a. The heat produced by the heating medium is transferred to the side region S2 via the side mold 3. The open section of the side mold 3 is closed by a bead ring 8b, which molds the periphery of the other of the bead regions Tb, Tb, and a clamp ring 12b, which holds the bladder 10 to be discussed later.

The plurality of sector molds 4 enclose the crown region C1 of the tire T annularly as they are combined with each other circumferentially. The sector molds 4 are, for instance, 8 divisions along the circumference of the tire T. A pattern forming surface 4a that comes in contact with the surface of the crown region C1 has raised and recessed portions for forming a predetermined tread pattern on the surface of the crown region C1. As the pattern forming surface 4a comes in contact with the surface of the crown region C1, an inverted tread pattern of recesses and projections formed on the pattern forming surface 4a is formed on the crown region C1.

The plurality of sector molds 4 are held by a plurality of segments 9 which are movable radially wider or narrower along a slider mechanism disposed on the base 5. The outer periphery 9a of the segments 9 is formed as an inclined surface of the same gradient as that of the inner periphery 11b of the arm portion 11 of the outer ring 7. At the start of the curing process, the center post 6 is lowered to have the inner periphery 11b of the arm portion 11 slide along the outer periphery 9a of the segments 9, thus radially moving the segments 9 narrower. And as the center post 6 reaches the lowering limit position, the plurality of sector molds 4 enclose the crown region C1 of the tire T without gaps therebetween. Formed inside the arm portion 11 of the outer ring 7 is an annular heating chamber 11a so disposed as to be opposite to the outer periphery 9a of the segments 9. As with the other heating chambers 5a and 7a, a heating medium is supplied to the heating chamber 11a from a not-shown heat source supply unit. The heat produced by the heating medium is transferred to the crown region C1 via the segments 9 and the sector molds 4.

When removing the tire T from the mold on completion of the curing process, the center post 6 is raised to tree the hold on the segments 9 by the portion 11 of the outer ring 7 and cause the segments 9 to spread radially.

A bladder 10 is placed on the inner periphery of the tire T enclosed by the side molds 2 and 3 and the plurality of sector molds 4. The bladder 10 is of an elastic material inflatable by a fluid supplied from the outside of the curing apparatus 1. As the bladder 10 is inflated, the outer periphery of the bladder 10 comes into tight contact with the inner periphery of the tire T and pushes the outer periphery of the tire T against the side molds 2 and 3 and the plurality of sector molds 4.

As described above, the tire T inside the curing apparatus 1 is held in a state of being pressed by the side molds 2 and 3, the plurality of sector molds 4, and the bladder 10. Further, the tire T is heated gradually by the heating medium supplied into the plurality of heating chambers 5a, 7a, and 11a as the curing progresses.

Supplied into the plurality of heating chambers 5a, 7a, and 11a is a heating medium, such as steam or a high-temperature inert gas, from a not-shown heat source supply unit via a not-shown feed pipe. The heat source supply unit is provided with a controller for adjusting the temperature and flow rate of the heating medium to be supplied to the heating chambers 5a, 7a, and 11a. And the controller controls the temperature and flow rate of the heating medium supplied into the plurality of heating chambers 5a, 7a, and 11a by controlling the heater for adjusting the temperature of the heating medium and a flow regulating valve disposed on the feed pipe.

The side mold 2 and the bead ring 8a sitting on the base 5 are gradually heated by the heating medium supplied into the heating chamber 5a. The heat transferred to the side mold 2 is transferred mainly to the side region S1 of the tire T, which is in contact with the molding surface 2a of the side mold 2, thus accelerating the curing of the side region S1. Also, the heat transferred to the bead ring 8a is transferred mainly to one of the bead regions Tb, Tb of the tire T, which is in contact with the bead ring 8a, thus accelerating the curing of the bead region Tb.

The side mold 3 and the bead ring 8b placed under the lower face of the outer ring 7 are gradually heated by the heating medium supplied into the heating chamber 7a. The heat transferred to the side mold 3 is transferred mainly to the side region S2 of the tire T, which is in contact with the molding surface 3a of the side mold 3, thus accelerating the curing of the side region S2. Also, the heat transferred to the bead ring 8b is transferred mainly to the other of the bead regions Tb, Tb of the tire T, which is in contact with the bead ring 8b, thus accelerating the curing of the bead region Tb.

The segment 9, which comes in contact with the inner periphery of the arm portion 11 of the outer ring 7, and the sector molds 4, which are held in contact with the inner periphery of the segment 9, are gradually heated by the heating medium supplied into the heating chamber 11a. The heat transferred to the sector molds 4 is transferred mainly to the crown region C1 of the tire T, which is in contact with the pattern forming surface 4a of the sector molds 4, thus accelerating the curing of the crown region C1. The sector molds 4 according to this embodiment is so structured as to create a difference between the amount of heat given to the center area CCe of the crown region C1 and the amount of heat given to the shoulder areas CSh1 and CSh2 in the crown region C1 during the period from the start to the end of the curing process. In this structure, appropriate amounts of heat are given to the center area CCe and the shoulder areas CSh1 and CSh2, respectively.

Hereinbelow, a detailed description is given of the structure of the sector molds 4 with reference to FIG. 2 and FIG. 3. It is to be noted that the ranges of the center area CCe and the shoulder areas CSh1 and CSh2 vary with the profile of the crown region C1 of the tire T. Let us define here the center area CCe as at least an area astride the width direction center (tire center TC) of the crown region C1 of the tire T and the shoulder areas CSh1 and CSh2 as the remaining areas other than the center area CCe.

Figure 2:
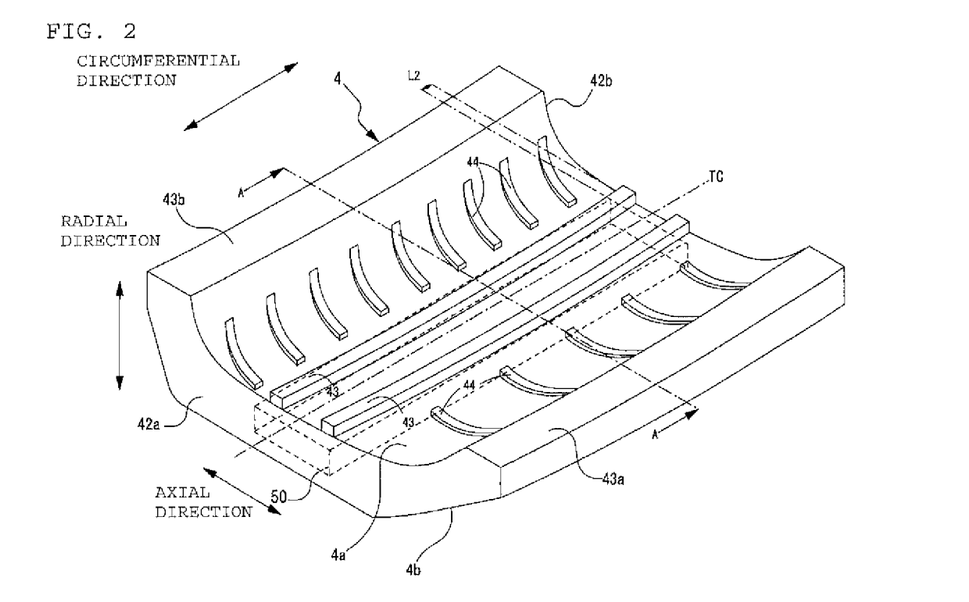
FIG. 2 is an overall perspective view of a sector mold.

FIG. 2 is a schematic perspective view showing a sector mold 4 out of a plurality of sector molds 4. FIG. 3 is a cross section (2-2 (A-A) of FIG. 2) in the width direction of a sector mold. It is to be noted that "the width direction", "the circumferential direction", and "the radial direction" as used herein refer to the directions of the tire T placed in a curing apparatus 1 as shown in FIG. 1.

As shown in FIG. 2, the sector mold 4 has a pattern forming surface 4a, which comes in contact with the outer periphery of the crown region C1 of the tire T, and an outer peripheral surface 4b, which comes in contact with the inner periphery 9b of the segment 9. The pattern forming surface 4a and the outer peripheral surface 4b are bent continuously along the circumferential direction at a predetermined curvature so as to correspond to the curvature of the outer peripheral surface of the crown region C1 of the tire T. The end faces 42a and 42b in the circumferential direction connecting the pattern forming surface 4a and the outer peripheral surface 4b are respectively abutted on the end faces 42b and 42a of circumferentially neighboring sector molds 4. Also, the end faces 43a and 43b in the axial direction connecting the pattern forming surface 4a and the outer peripheral surface 4b are abutted on the outer peripheries of the side molds 2 and 3 via the stepped portions 21 and 31 formed on the outer peripheries of the side molds 2 and 3, respectively.

Formed on the pattern forming surface 4a are pattern molding projections, such as a plurality of main groove molding projections 43 and a plurality of lateral groove molding projections 44. The plurality of main groove molding projections 43 are formed at equal distances from the tire center TC therebetween and extend continuously in the circumferential direction on the pattern forming surface 4a. The plurality of lateral groove molding projections 44 are arranged at equal intervals in the circumferential direction on the pattern forming surface 4a and extend in arcs from the main groove molding projection 43 side toward the end face 43a and 43b sides, respectively. The outer periphery of the crown region C1 of the tire T, as it is pressed against the pattern forming surface 4a having the main groove molding projections 43 and the lateral groove molding projections 44, will have a tread pattern formed that has lands and grooves in the inverted shapes of the above-mentioned projections formed on the pattern forming surface 4a. It should be noted, however, that the shapes of the pattern forming surface 4a as illustrated are examples only. And it is possible to mold various tread patterns on the outer periphery of the crown region C1 by changing the number, shape, and dimensions of the main groove molding projections 43 and the lateral groove molding projections 44 and other factors, such as presence or absence of blades for forming sipes. Although the details will be discussed later, the sector mold 4 having the above-described structural features can be molded by a general metal casting method or an additive fabrication method to be discussed later, using iron, aluminum, stainless steel, or an alloy of these metals, for instance.

Figure 3:
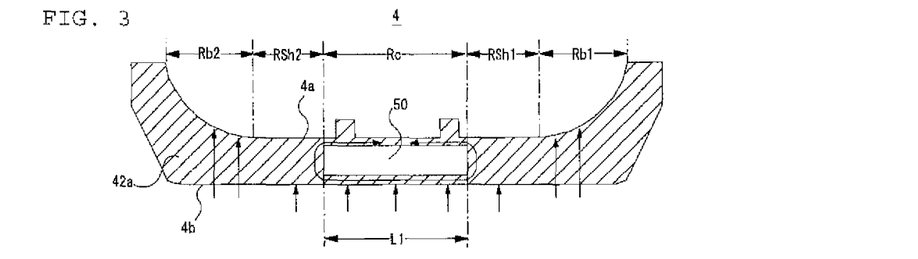
FIG. 3 illustrates a cross section (A-A section of FIG. 2) in the width direction of the sector mold.

As shown in FIG. 2 and FIG. 3, a hollow portion 30 of a predetermined shape is provided inside the sector mold 4. The hollow portion 50 is a hollow space of an approximately rectangular cross section extending continuously in the circumferential direction inside the sector mold 4, that is, between the pattern forming surface 4a and the outer peripheral surface 4b. The width direction dimension L1 of the hollow portion 50 may be optionally set in accordance with the width direction shape of the pattern forming surface 4a, for instance. For example, the sector mold 4 shown in FIG. 2 and FIG. 3 has the pattern forming surface 4a, which has a center area pattern-molding range Rc for pattern-molding the center area CCe, a part of the crown region C1 of the tire T, shoulder area pattern-molding ranges RSh1 and RSh2 for pattern-molding the shoulder areas RSh1 and RSh2, respectively, also parts of the crown region C1 of the tire T, and buttress pattern-molding ranges Rb1 and Rb2 for pattern-molding the buttress regions of the tire T. And the width direction dimension L1 of the hollow portion 50 is set at a length corresponding to the width direction dimension of the center area pattern-molding range Rc. And provided inside the sector mold 4 according to the present embodiment is a hollow portion 50 corresponding in position and range to the center area pattern-molding range Rc for pattern-molding the center area CCe, a part of the crown region C1.

It is to be noted that the circumferential dimension of the hollow portion 50 may be a dimension shorter than the dimension between the circumferential end faces 42a and 42b. On the other hand, it is desirable that the dimension L2 (thickness) between the end faces 42a and 42b and the respective circumferential ends of the hollow portion 50 is set at 1 mm to 10 mm, for instance, from the viewpoint of minimizing the interval where there is no hollow portion 50 when a plurality of neighboring sector molds 4 are assembled with each other.

Also, in the present example, the hollow portion 50 is provided in a position inside of the mold and radially outer side than the pattern forming surface 4a. According to this arrangement, the hollow portion 50 is located closer to the heat source, which gives heat to the sector mold 4, and thus capable of more efficiently controlling the heat transfer properties than when the hollow portion 50 is located within the main groove molding projection 43 provided on the pattern forming surface 4a.

The hollow portion 50 is disposed inside the sector mold 4 in a position corresponding to the center area pattern-molding range Rc. As a result, the heat transferring from the heating chamber 11a to the outer peripheral surface 4b side of the sector mold 4 is insulated by the gas (air) in the hollow portion 50 and reaches the center area pattern-molding range Rc by coming around the hollow portion 50 as indicated by arrows. In other words, the amount of heat given to the center area CCe during the predetermined period of time from the start of curing is so controlled as to be less than the amount of heat given to the shoulder areas CSh1 and CSh2 where there is no presence of the hollow portion 50. Accordingly, it is possible to prevent an overcuring of the center area CCe with a thinner gauge thickness and ensure an appropriate degree of curing in both the center area CCe and the shoulder areas CSh1 and CSh2 when the curing has progressed to an appropriate degree of curing in the shoulder areas CSh1 and CSh2.

Figure 12B:
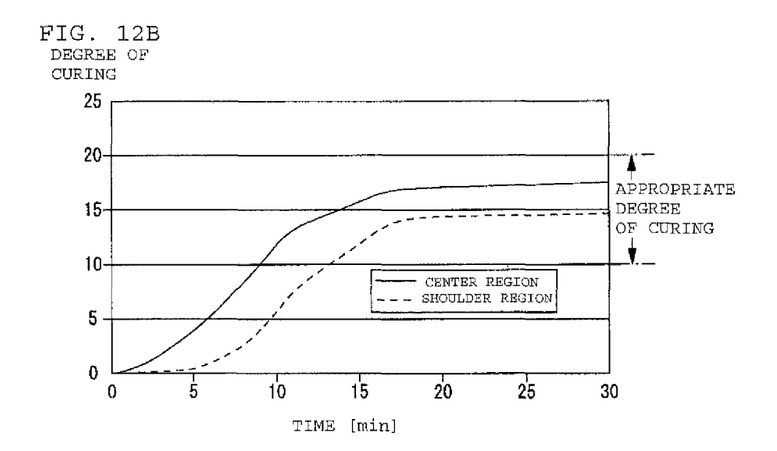

FIG. 12B is a graph showing temporal changes in the degree of curing in the center area CCe and the shoulder areas CSh1 and CSh2 when a curing is performed with a curing apparatus 1 equipped with the sector molds 4 having the hollow portion 50 as in the foregoing embodiment. As is clear from comparison with FIG. 12A, the sector mold 4 according to the present embodiment has the amount of heat given to the center area CCe with a thinner gauge thickness controlled to be smaller than that given to the shoulder areas CSh1 and CSh2 with a thicker gauge thickness. As a result, it can be confirmed that after a predetermined time lapse (e.g., after 30 minutes) from the start of curing, the degree of curing in the center area CCe and the degree of curing in the shoulder areas CSh1 and CSh2 are both in the range of appropriate degrees of curing.

Second Embodiment

Figure 4:
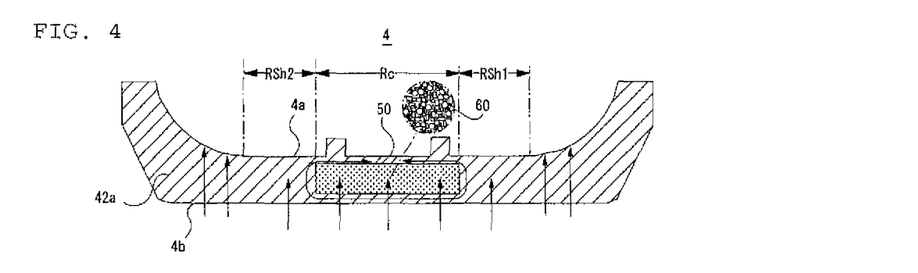
FIG. 4 illustrates a cross section in the width direction of a sector mold according to another embodiment (second embodiment).

FIG. 4 is a cross section in the width direction of a sector mold 4 according to another embodiment (second embodiment). Compared with the sector mold 4 in the first embodiment, the sector mold 4 in the present embodiment differs in that a heat amount adjusting agent 60 is held in the hollow portion 50. In the foregoing embodiment, the arrangement is such that the amounts of heat given to the center area CCe and the shoulder areas CSh1 and CSh2 are differentiated from each other by insulating the heat from the heating chamber 11a by air in the hollow portion 50. In doing so, the difference in the amount of heat most be set as appropriate according to the difference in gauge thickness between the center area CCe and the shoulder areas CSh1 and CSh2 of the tire T to be cured. The sector mold 4 according to this embodiment, however, is so arranged that the heat transfer property in the hollow portion 50 is controlled by the heat amount adjusting agent 60 held inside the hollow portion 50.

In this implementation, the heat amount adjusting agent 60 to be held inside the hollow portion 50 may be of any material as long as it is at least different from that of the sector mold 4. For example, metallic powder, particles, and chips of iron, aluminum, stainless steel, copper, silver, etc., and powdery or granular materials which are mixtures of these metals may be widely used as the material of the heat amount adjusting agent 60. Also, the powdery or granular materials may be of any particle diameter, size, volume, and surface shape and roughness as long as they can be held within the hollow portion 50. Moreover, powdery or granular materials of resin may be employed, and liquids, such as water or oil, or their mixtures may be used also. Also, when a resin is used, resin powder, particles, and chips of rubber, polyethylene, polypropylene, ABS, etc., or powdery or granular materials which are mixtures of these resins may be widely used. How the heat amount adjusting agent 60 is held within the hollow portion 50 will be described later.

The heat amount adjusting agent 60 consisting of any of the above-cited powdery or granular materials may be held within the hollow portion 50. In such an arrangement, the heat conductivity inside the hollow portion 50 can be controlled by adjusting the size, density, mixing ratio, amount, etc., of the powder, particles, or chips constituting the powdery or granular material. And appropriate amounts of heat can be imparted to different regions of the object to be heated. In this example, therefore, the amount of heat given to the center area CCe can be adjusted as desired. Accordingly, the difference in the amount of heat given to the center area CCe and the shoulder areas CSh1 and CSh2 can be adjusted as desired. Further, although the detail will be discussed later, the arrangement of holding a powdery or granular material in the hollow portion 50 makes it possible to reuse the heat amount adjusting agent 60 once held in the hollow portion 50.

Third Embodiment

Figure 5:
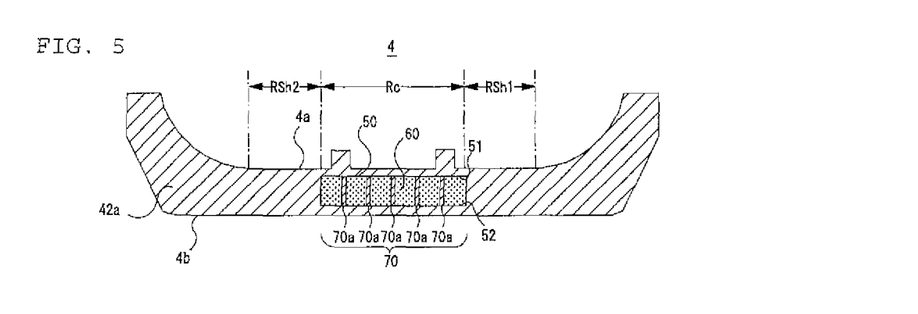
FIG. 5 illustrates a cross section in the width direction of a sector mold according to another embodiment (third embodiment).

FIG. 5 is a cross section in the width direction of a sector mold 4 according to another embodiment. Compared with the sector mold 4 in the second embodiment, the sector mold 4 in the present embodiment differs in that heat transfer assisting member 70 is formed within the hollow portion 50 holding a heat amount adjusting agent 60. As shown in the figure, the heat transfer assisting member 70 is constituted by a plurality of columnar members 70a extending between the radially inner surface 51 and the radially outer surface 52 defining the shape of the hollow portion 50. The plurality of columnar members 70a are formed of the same metal as that of the sector mold 4 or of a metal having a different heat conductivity. Also, the plurality of columnar members 70a are, for instance, arranged within the hollow portion 50 at equal intervals along the width and circumferential directions.

With the heat transfer assisting member 70 disposed in this manner, heat can easily reach the center area pattern-molding range Rc by way of the heat transfer assisting member 70 inside the hollow portion 50. Thus, the heat conductivity inside the hollow portion 50 can be controlled by setting as appropriate the volumetric ratio of the heat transfer assisting member 70 to the hollow portion 50 or the heat conductivity of the heat transfer assisting member 70. Preferably, the volume of the heat transfer assisting member 70 is set within a range of 5% to 50% of the volume of the hollow portion 50. The setting in this range can not only secure a sufficient volume for holding the heat amount adjusting agent 60 but also help retain the influence on the change in heat conductivity inside the hollow portion 50 holding the heat amount adjusting agent 60.

That is, too large a volume of the heat transfer assisting member 70 may tend to excessively increase the dependency of the heat conductivity of the hollow portion 50 on the volume of the heat transfer assisting member 70. As a result, it becomes difficult to control the heat conductivity by placing a heat amount adjusting agent 60 in the hollow portion 50. Thus, setting the volume of the heat transfer assisting member 70 in the above-mentioned range can leave ample leeway for controlling the heat conductivity by adjusting the heat amount adjusting agent 60. Also, with the heat transfer assisting member 70 provided within the hollow portion 50, the mechanical strength of the mold, namely, the durability of the center area pattern-molding range Rc in the present example, can be improved. It is to be noted here that the arrangement may be such that the heat transfer assisting member 70 only is provided in the hollow portion 50 without holding the heat amount adjusting agent 60 therein.

Also, in the foregoing example, the heat transfer assisting member 70 is constituted by a plurality of columnar members 70a extending linearly between the radially inner surface 51 and the radially outer surface 52. However, the constitution to be employed is not limited to this. For example, a truss structure may be formed with the plurality of columnar members 70a inclined. Or a honeycomb structure may be constructed inside the hollow portion 50 without using the columnar members 70a.

Figure 6:
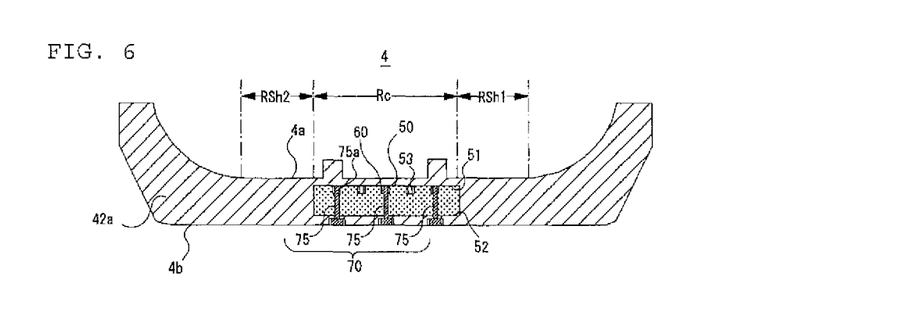
FIG. 6 illustrates a cross section in the width direction of a sector mold according to a variation of the third embodiment.

FIG. 6 is a cross section in the width direction of a sector mold 4 according to a variation of the third embodiment. This variation differs from the foregoing embodiment in that the heat transfer assisting member 70 is removably inserted into the hollow portion 50. As shown in FIG. 6, the heat transfer assisting member 70 in this implementation is constituted by bolts 75 that can be screwed into the heat transfer assisting member 70 from the outer peripheral surface 4b side. The threaded portions 75a formed at the end of the bolts 75 are screwed into the threaded holes 53 formed in the radially inner surface 51 defining the hollow portion 50, and the bolts 75 extend linearly between the radially inner surface 51 and radially outer surface 52. Thus, the removable insertion of the heat transfer assisting member 70 from outside and the possibility of increasing or decreasing the number thereof make it possible to efficiently control the heat conductivity inside the hollow portion by adjusting the occupancy of the heat transfer assisting member 70 in the hollow portion 50. It is to be noted that in the example of the figure, the bolts 75 are screwed in from the outer peripheral surface 4b side. However, the arrangement may be such that predetermined threaded holes are made in the radially outer surface 52 and the bolts 75 are screwed in from the pattern forming surface 4a side. Or the arrangement may be such that the bolts 75 are screwed in from both sides.

Fourth Embodiment

Figure 7:
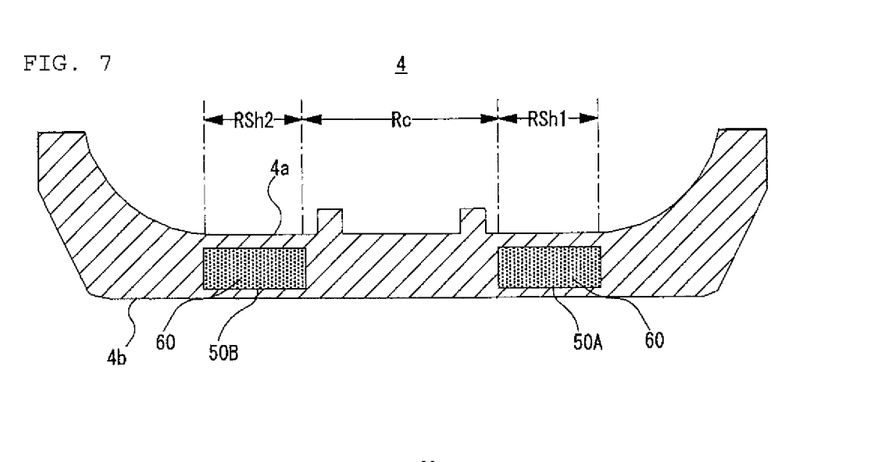
FIG. 7 illustrates a cross section in the width direction of a sector mold according to another embodiment (fourth embodiment).

FIG. 7 is a cross section of a sector mold 4 in the width direction to another embodiment. Compared with the sector mold 4 in the foregoing plurality of embodiments, the sector mold 4 in the present embodiment differs in that a plurality of hollow portions 50A and SOB are disposed independently of each other in positions corresponding to the shoulder area pattern-molding ranges RSh1 and RSh2, respectively, and a heat amount adjusting agent 60 made of a powdery or granular metal whose heat conductivity is higher than that of the metal of the sector mold 4 is held in each of the hollow portions 50A and 50B. The plurality of hollow portions 50A and 50B are disposed inside independently of each other without communication therebetween. The state of the plurality of hollow portions being disposed independently of each other meant here is the state of the hollow portions having no communication with each other. In this arrangement, the heat conductivity of the hollow portions 50A and 50B corresponding to the shoulder area pattern-molding ranges RSh1 and RSh2 can be raised higher than that of the center area pattern-molding range Rc where there is no hollow portion. Accordingly, the amount of heat given to the shoulder area pattern-molding ranges RSh1 and RSh2 which have thicker gauge thickness than the center area CCe can be made greater than that given to the center area CCe. As a result, on completion of the curing process, appropriate degrees of curing can be achieved both in the center area CCe and the shoulder areas CSh1 and CSh2.

Fifth Embodiment

Figure 8:
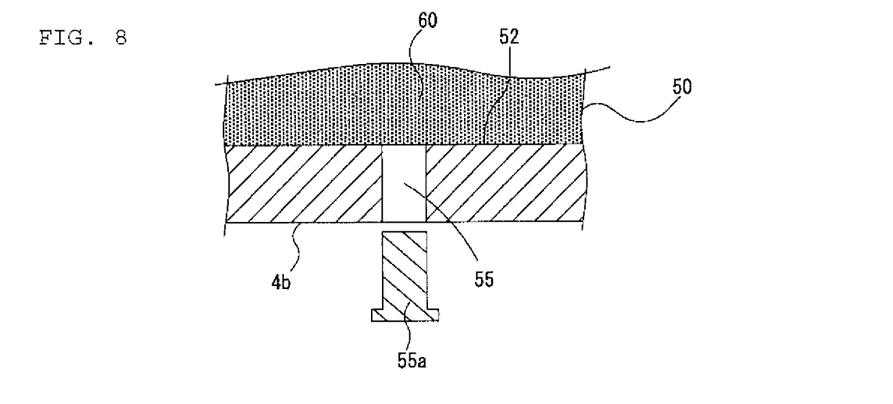
FIG. 8 illustrates a cross section in the width direction of a sector mold according to another embodiment (fifth embodiment).

FIG. 8 is a partially enlarged view of a sector mold 4 according to another embodiment (fifth embodiment). Compared with the sector mold 4 described in the foregoing plurality of embodiments, the sector mold 4 in the present embodiment differs in that heat an adjusting agent supply-discharge passage 55 communicating with the hollow portion 50 is formed. The heat amount adjusting agent supply-discharge passage 55 is a conduit extending from the outer peripheral surface 4b of the sector mold 4 to the radially outer side 52 defining the shape of the hollow portion 50. It is to be noted that the number, positions, and conduit diameter of the heat amount adjusting agent supply-discharge passages 55 are not subject to limitations. For example, a plurality of heat amount adjusting agent supply-discharge passages 55 may be formed along the width direction or the circumferential direction of the hollow portion 50, with the conduit diameter so selected that the powdery or granular material constituting the heat amount adjusting agent 60 can pass therethrough. Then the work of supplying and discharging the heat amount adjusting agent 60 can be speeded up.

During the use of the sector mold 4 (curing of the tire T), the heat amount adjusting agent supply-discharge passage 55 is sealed by a sealing member 55a which is inserted or screwed into the sector mold 4 from the outer peripheral surface 4b thereof. The sealing member 55a, which is a pin made of the same metal as the sector mold 4, prevents the heat amount adjusting agent 60 held within the hollow portion 50 from being released outside. On the other hand, the sealing member 55a is pulled out from the outside after the use of the sector mold 4. Then the hollow portion 50 is communicated with the outside of the sector mold 4 via the heat amount adjusting agent supply-discharge passage 55, thus making it possible to discharge and recover the heat amount adjusting agent 60 having been held within the hollow portion 50. In this manner, the heat amount adjusting agent supply-discharge passage 55 is provided that allows communication between the hollow portion 50 formed inside the sector mold 4 and the outside of the sector mold 4. As a result, the heat amount adjusting agent 60 can be supplied and discharged as desired. And it becomes possible to control the heat conductivity inside the hollow portion 50 in accordance with the gauge thickness of the tire T. Also, the reuse of the heat amount adjusting agent 60 helps promote resource saving and cost reduction. It should be noted that the same advantageous effects can be achieved for the sector mold 4 according to the fourth embodiment having a plurality of hollow portions 50A and 50B by providing a plurality of heat amount adjusting agent supply-discharge passages 55 corresponding to the hollow portions 50A and 50B.

Figure 9:
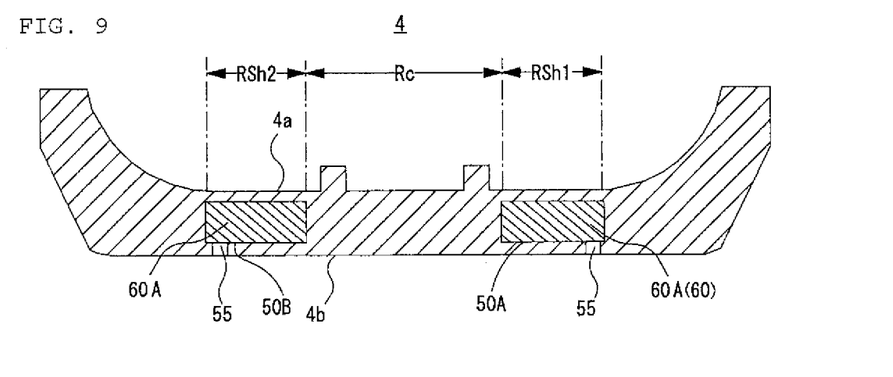
FIG. 9 illustrates a cross section in the width direction of a sector mold according to another embodiment (sixth embodiment).

FIG. 9 is a cross section in the width direction of a sector mold 4 provided with hollow portions 50A and 50B as explained in the fourth embodiment and heat amount adjusting agent supply-discharge passages 55 as explained in the fifth embodiment. In this example, a product material 60A formed into a lump of powdery or granular material of aluminum, for instance, is held as the heat amount adjusting agent 60 in each of the hollow portions 50A and 50B. It is to be noted that the sector mold 4 in this example is made of iron, for instance.

As the product material 60A to be held in the hollow portions 50A and 50B, a powdery or granular material of aluminum is held in each of the hollow portions 50A and 50B, and the heat amount adjusting agent supply-discharge passages 55 are each sealed by a sealing member 55a. Then the sector mold 4 is placed and heated in a not-shown heating oven. When the temperature inside the sector mold 4 reaches the melting point of aluminum, the powdery or granular material held inside the hollow portions 50A and 50B will get melted into a liquid. Then the sector mold 4 is removed from the heating oven and cooled to have the liquefied aluminum solidify inside the hollow portions 50A and 50B. In this manner, the product material 60A formed into a lump of powdery or granular material of aluminum can be contained in each of the hollow portions 50A and 50B by melting and then solidifying it therein. Also, to discharge the product material 60A of aluminum held in the hollow portions 50A and 50B to the outside of the sector mold 4, the sector mold 4 is again placed in the heating oven to melt and liquefy the product material 60A. Then the liquefied aluminum is discharged outside through the heat amount adjusting agent supply-discharge passages 55. Thus, the use of the product material 60A, which is the powdery or granular material melted and then solidified, as the heat amount adjusting agent 60 may improve the heat conductivity inside the hollow portions 50A and 50B compared to a case of introducing a powdery or granular material. It is to be noted, however, that in the above example, the powdery or granular material of aluminum is melted and then solidified. Instead, the arrangement may be such that two types or more of powdery or granular materials are melted and solidified as the product material 60A to be used as the heat amount adjusting agent 60 held in the hollow portions 50A and 50B. Also, in the above example, the powdery or granular material is melted and solidified inside the hollow portions 50A and 50B. But the powdery or granular material may be liquefied by melting outside in advance, and then the liquefied material may be injected into the hollow portions 50A and 50B through the heat amount adjusting agent supply-discharge passages 55 to be solidified inside the hollow portions 50A and SOB. Bu the use of this injection method, the product material 60A having the same volume as that of each of the hollow portions 50A and 50B can be held therein.

Seventh Embodiment

Figure 10A:
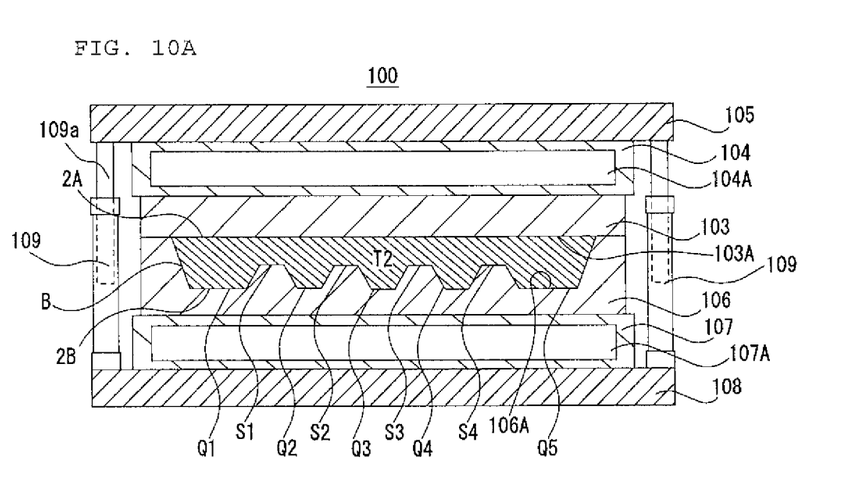
FIG. 10 is schematic cross sections showing a tread curing apparatus.

Hereinbelow, a description is given of an example in which the above-described implementations are applied to a tread forming mold as an example of the mold. FIG. 10A is a schematic cross section of a tread curing apparatus 100. The tread curing apparatus 100, as shown in the figure, includes a non-tread-side mold 103 constituting one of the tread forming molds, a non-tread-side platen 104, a non-tread-side base 105, a tread-side mold 106 constituting the other of the tread forming molds, a tread-side platen 107, a tread-side base 108, and a lifting and lowering mechanism 109. The non-tread-side mold 103 is a rectangular mold made of iron, for instance. The non-tread-side mold 103 transfers heat from the non-tread-side platen 104 disposed thereabove as a heat source to an uncured tread (hereinafter referred to simply as "tread") T2 as the object to be heated. The non-tread-side mold 103 has a surface facing the non-tread side 2A of the tread T2 formed as a molding surface 103A. The molding surface 103A is a flat surface coming in contact with the non-tread side 2A of the tread T2. The non-tread side 2A of the tread T2 coming in contact with the molding surface 103A is molded as a flat surface both in the width and length directions by the molding surface 103A.

The non-tread-side platen 104 is fixed on the upper surface of the non-tread-side mold 103. Formed inside the non-tread-side platen 104 is a heating chamber 104A corresponding to the width direction of the tread T2 and extending along the length direction thereof. A heating medium is supplied into the heating chamber 104A from a not-shown heat source supply unit. And the heat produced by the heating medium is transferred to the tread T2 by way of the non-tread-side mold 103. The non-tread-side base 105 is fixed on the upper surface of the non-tread-side platen 104. The non-tread-side base 105 is movably held by the lifting and lowering mechanism 109 installed upright at both width ends of the tread-side base 108.

The tread-side mold 106 is disposed to be opposite to the non-tread-side mold 103 fixed above in pairs therewith. The tread-side mold 106, as with the non-tread-side mold 103, is a rectangular mold made of iron. And the tread-side mold 106 transfers heat to the tread T2 from the tread-side platen 107 disposed therebelow as a heat source. The tread-side mold 106 has a surface facing the tread side 2B of the tread T2 formed as a molding surface 106A which performs its function during curing. In this example, the molding surface 106A has raised and recessed portions formed successively in the width direction thereof. When the molding surface 106A and the molding surface 103A of the non-tread-side mold 103 are brought into close contact with each other by a press motion to be discussed later, the tread T2 placed inside the molding space B is pushed against the molding surface 106A. With the tread T2 pressed against the molding surface 106A, the tread surface 2B of the tread T2 will have a tread pattern formed successively in the width and length directions with a plurality of land portions Q1 to Q5 and the groove portions S1 to S4 in between the plurality of land portions Q1 to Q5, which are the inversion of the recessed and raised portions of the molding surface 106A.

Formed inside the tread-side platen 107 is a heating chamber 107A corresponding to the width direction of the tread T2 and extending along the length direction thereof. A heating medium is supplied into the heating chamber 107A from a not-shown heat source supply unit. And the heat produced by the heating medium is transferred to the tread T2 byway of the tread-side mold 106. The tread-side platen is disposed on the tread-side base 108. The tread-side base 108 is movably held by the lifting and lowering mechanism 109. The lifting and lowering mechanism 109 has a pair of rods 109a which are vertically extended or contracted hydraulically, for instance. With the rods 109a extended or contracted, a press motion or a release motion of the non-tread-side mold 103 and the tread-side mold 106 is performed. As described above, curing of the tread T2 is accelerated as it is pressurized and heated within the molding space B formed by the non-tread-side mold 103 and the tread-side mold 106. Also, a plurality of hollow portions 50A to 50E are disposed inside the tread-side mold 106 according to this embodiment.

Figure 10B:
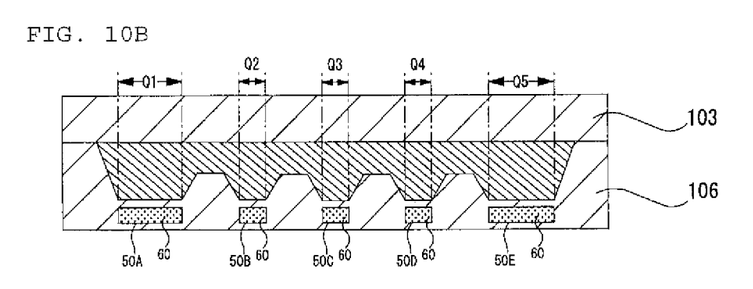

FIG. 10B is an enlarged cross section of the non-tread-side mold 103 and the tread-side mold 106. As shown in the figure, the tread-side mold 106 has a plurality of hollow portions 50A to 50E disposed therein in positions and range corresponding to those of the plurality of land portions Q1 to Q5 formed on the tread surface 2B of the tread T2. Also, the heat amount adjusting agent 60 consisting of a powdery or granular material of aluminum with higher heat conductivity than iron is densely packed in each of the hollow portions 50A to 50E. In this arrangement, the amount of heat to be given to the land portions Q1 to Q5 with thicker gauge thickness than the groove portions S1 to S4 can be improved than the amount of heat given to the groove portions S1 to S4. Thus, on completion of the curing process, appropriate degrees of curing can be achieved in both the land portions Q1 to Q5 and groove portions S1 to S4 despite the difference in gauge thickness. It is to be noted that in this implementation, a plurality of hollow portions 50A to 50E disposed in positions and range corresponding to those of the plurality of land portions Q1 to Q5 are provided. However, the arrangement may also be such that a plurality of hollow portions 50A to 50E are disposed in positions and range corresponding to those of the plurality of groove portions S1 to S4. And a heat amount adjusting agent 60 consisting of a powdery or granular material of a plurality of metal types, such as a combination of aluminum and iron, which is different from the metallic material of the tread-side mold 106, may be contained in each of the hollow portions, thereby controlling the amount of heat to be given to the groove portions S1 to S4 with thinner gauge thickness than the land portions Q1 to Q5. Though a detailed description is not given, it is to be noted that the tread T2 cured by the tread curing apparatus 100 is integrated with the base tire whose tread region being removed.

Method for Manufacturing

Now, a description is given of a main method for manufacturing a sector mold 4, using the sector mold 9 according to the above-described second embodiment as an example. As already mentioned, the sector mold 4 is manufactured using a general metal casting method or an additive fabrication method. In the additive fabrication method in particular, the master data for the sector mold 4 consisting of three-dimensional CAD data or the like is converted into a plurality of slice data (lamination data). Then the layers corresponding to the shape of the respective parts of the sector mold 4 represented by the converted slice data are laminated layer by layer. And the entire shape of the sector mold 4 represented by the master data is formed and manufactured.

Also, there are certain desirable methods employable as the additive fabrication method in manufacturing the sector mold 4. In one of such methods, the layers corresponding to the shape represented by the respective slice data are formed into a shape successively as the powdery or granular material of a metal, injected under irradiation of laser beam, is melted and fused together in a molding machine which receives a plurality of slice data. In another, the layers corresponding to the shape represented by the respective slice data are formed into a shape as the powdery or granular material of a metal, which has been placed in a chamber in advance, is irradiated with a laser and thus melted and fused together in a molding machine which receives a plurality of slice data.

Figure 11:
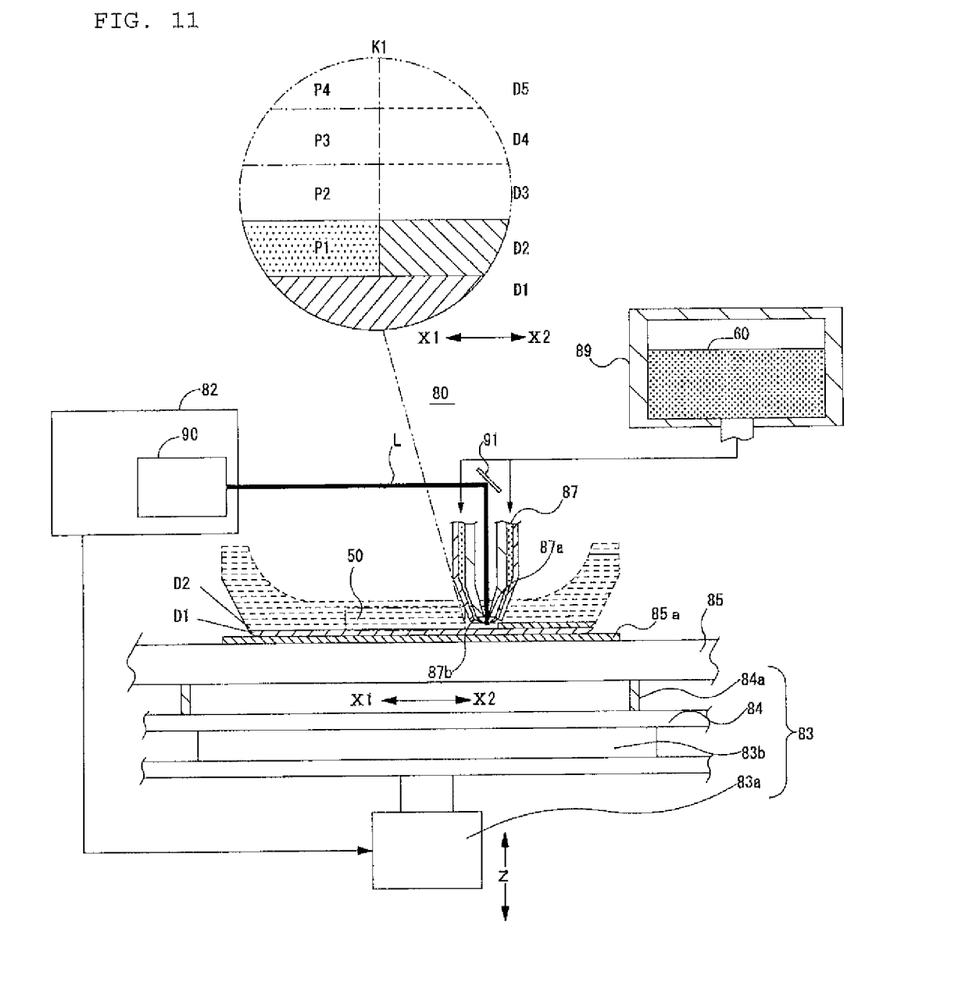
FIG. 11 is a schematic representation showing an example of an additive fabrication apparatus.

FIG. 11 is a schematic illustration of an additive fabrication apparatus 80. The additive fabrication apparatus 80 is comprised of a control unit 82, which receives slice data and controls the related mechanisms based on the slice data, a scanning table 85, which is disposed on a table moving unit 83 and movable in the X-axis, Y-axis, and Z-axis directions, a nozzle mechanism 87, which casts a laser beam while spraying a powdery or granular material of a metal in the direction of the basis material 85a laid on the scanning table 85, a chamber 89, which supplies the powdery or granular material constantly into the nozzle mechanism 87, and a laser output unit 90, which outputs laser light L to the nozzle mechanism 87. It is to be noted that in the present example, the nozzle mechanism 87 sprays iron powder, which is one example of the powdery or granular material of a metal.

The scanning table 85 is disposed on the table moving unit 83. The table moving unit 83 is comprised of a lifting unit 83a, which moves the scanning table 85 up and down in the Z-axis direction, a slider mechanism 83b, which is disposed on a support plate movable in conjunction with the up-and-down motion of the lifting unit 83a, a movable plate 84, which is made slidable in the X-axis (right-left) direction by the slider mechanism 83b, and a slider mechanism 84a, which is disposed on the movable plate 84. The slider mechanism 84a supports the scanning table 85 slidably in the Y-axis (front-back) direction perpendicular to the X-axis direction. The lifting unit 83a and the slider mechanisms 83b and 84a are provided with their respective drive sources, such as motors, that operate according to the drive signals outputted from the control unit 82. With these drive sources repeatedly controlled according to the slice data, the corresponding layers are stacked successively into a shape represented by the slice data. It is to be noted that in the present example, the stacking direction of the sector mold 4 is set to the direction from radially outer side toward inner side. However, the stacking direction may be set to circumferential or width direction of the sector mold 4. Once a layer corresponding to the first slice data is formed by the repeated scannings in the X-axis and Y-axis directions by the scanning table 85, the scanning table 85 lowers in the Z-axis direction. Then the layer corresponding to the slice data on the directly above layer is formed again by the repeated scannings in the X-axis and Y-axis directions by the scanning table 85. It is to be noted that in the present example, the additive fabrication apparatus 80 moves the scanning table 85 in the X-axis, Y-axis, and Z-axis directions in relation to the interior of the nozzle mechanism 87. However, the arrangement may also be such that the nozzle mechanism 87 moves in relation to the scanning table 85 or that both of these units move, respectively.

The nozzle mechanism 87, which is a cylindrical member extending in the I-axis direction, has an irradiation port 87a from which laser light L is cast toward the basis material 85a. The laser light L cast from the irradiation port 87a is generated by the laser output unit 90 located inside the control unit 82. The control unit 82 controls the laser output unit 90 based on the respective slice data, thereby controlling the output, output timing, output duration, etc., of laser light L from the laser output unit 90. The light path of laser light L outputted from the laser output unit 90 is adjusted by a light path adjusting mirror 91. The laser light L reflected by the light path adjusting mirror 91 is cast to the basis material 85a after being passed through substantially the center of the irradiation port 87a disposed at the tip of the nozzle mechanism 87.

Disposed around the irradiation port 87a of the nozzle mechanism 87 is a spray nozzle 87b for spraying iron powder contained in the chamber 89 toward the basis material 85a. The iron powder to be sprayed from the spray nozzle 87b is constantly supplied from the chamber 89 which communicates with the spray nozzle 87b by way of a not-shown supply tube. The iron powder reaching the spray nozzle 87b is sprayed toward the basis material 85a in such a manner as to converge on the laser light L together with the shield gas jetted from a not-shown gas nozzle formed immediately before the spray nozzle 87b. It is to be noted that the jetting of the shield gas is also controlled by the control unit 82.

The iron powder sprayed toward the basis material 85a is melted and fused together by the high-output laser light L irradiated from the irradiation port 87a. Thus, the shape represented by the slice data is formed with the scanning table 85 performing scannings in the X-axis and Y-axis directions according to the slice data while the irradiation of laser light L and the spray of iron powder are done at the same time by the nozzle mechanism 87.

Next, a description is given of an example of forming a hollow portion 50 inside the sector mold 4 by the additive fabrication apparatus 80. The enlarged view in FIG. 11 is an illustration showing a state in which the forming of a second layer to be stacked on the first layer is progressing based on slice data D2 after the end of forming the first layer based on slice data D1 for the lowermost layer. As illustrated in the figure, the slice data D2 for the second layer contains a region P1 indicated by a dot-and-dash line corresponding to a part of the shape of the hollow portion 50 extending in the width direction of the sector mold 4. Similarly, the slice data D3, D4, and D5 for the upper layers contain regions P2 to PA, respectively, corresponding to the parts of the shape of the hollow portion 50.

From the position indicated in the figure, the control unit 82 causes the scanning table 85 to scan in the direction from X1 to X2. And when the tip (laser light L) of the nozzle mechanism 87 reaches one end K1 of the width direction of the region P1, the control unit 82 causes the scanning table 85 to stop scanning toward X2. After the stop of scanning, the worker replaces the iron powder in the chamber 89 with a desired heat amount adjusting agent 60 consisting of a powdery or granular material other than iron powder. After the replacement with the heat amount adjusting agent 60, the control unit 82 resumes causing the scanning in the X2 direction of the table by the scanning table 85. Also, at this time, the control unit 82 controls the laser output unit 90 to stop the output of laser light L therefrom. On the other hand, the control unit 82 causes to splay of shield gas only, and performs a control for the spray of the heat adjusting agent 60 onto the already formed first layer.

The heat amount adjusting agent 60 sprayed onto the first layer remains in its shape without being melted because the output of laser light L is stopped. Also, the state of the output of laser light L being stopped continues until the tip of the nozzle mechanism 87 reaches the other end of the width direction of the region 91 with the scanning table 85 scanning in the X2 direction. With the tip of the nozzle mechanism 87 reaching the other end of the width direction of the region 91, the control unit 82 again causes the scanning table 85 to stop scanning in the X2 direction. After the stop of scanning, the worker replaces the heat amount adjusting agent 60 in the chamber 89 with the iron powder. After the replacement with the iron powder, the control unit 82 causes the spray of the iron powder onto the first layer and at the same time resumes causing the irradiation of laser light L. With the resumption of the spray of iron powder and the irradiation of laser light L, the forming of parts other than the region P1 contained in the slice data D2 and the already formed part on the one end K1 side in the width direction is resumed. After this, the region P1 contained in the slice data D2 is formed as part of the hollow portion 50 by replacement between iron powder and heat amount adjusting agent 60 and the repetition of the stop and resumption of laser light L output along with the scanning in the X-axis direction. Then the above-described control is repeated for slice data D3, D4, D5, . . . for the upper layers. Eventually, a hollow portion 50 having a shape represented by the three-dimensional CAD data is formed within the sector mold 4. And at the same time, a heat amount adjusting agent 60 consisting of a material different from the metal forming the sector mold 4 can be placed in the hollow portion 50. It is to be noted that by setting the amount of spray of the heat amount adjusting agent 60 in advance, the amount and density of the heat amount adjusting agent 60 held inside the hollow portion 50 can be adjusted as desired.

Also, in the foregoing example, a description has been given of the case where the iron powder is replaced with a heat amount adjusting agent 60 consisting of a powdery or granular material other than the iron powder. However, if iron powder is used as the heat amount adjusting agent 60, the arrangement may be such that the output of laser light L only is stopped without stopping the scanning by the scanning table 85, thus leaving the iron powder. Also, the arrangement may also be such that part of the powdery or granular material constituting the heat amount adjusting agent 60 is melted to change the size or density thereof by periodically or randomly casting the laser light L in the regions P1, P2, P3, . . . .

Thus far, a description has been given of an example of a method for manufacturing a sector mold 4 according to the second embodiment. In manufacturing a sector mold 4 according to the first embodiment, the sector mold 4 without containing the heat amount adjusting agent 60 in the hollow portion 50 can be obtained by stopping not only the irradiation of laser light L but also the spray of the heat amount adjusting agent 60 when the tip of the nozzle mechanism 87 reaches each of the regions P1, P2, P3, . . . .

Also, in manufacturing a sector mold 4 according to the third embodiment, part of the columnar members 70a may be formed by spraying iron powder or a powdery or granular material of a metal having a heat conductivity different from that of iron and at the same time irradiating laser light L when the tip of the nozzle mechanism 87 reaches the position of part of the heat transfer assisting member 70 (part of the columnar members 70a in this example) in the regions P1, P2, P3, . . . as defined by the slice data.

Also, the manufacturing of a sector mold 4 according to the fourth embodiment can be done easily by using three-dimensional CAD data for the sector mold 4 provided with the hollow portions 50A and 50B in positions corresponding to the shoulder area pattern-molding ranges RSh1 and RSh2. It is to be noted that the forming of the hollow portions 50A and 50B and the placement of the heat amount adjusting agent 60 can be performed in the same way as with the sector mold 4 according to the second embodiment.

Also, in manufacturing a sector mold 4 according to the fifth embodiment, the heat amount adjusting agent supply-discharge passage 55 communicating between the hollow portion 50 and the outside of the sector mold 4 can be formed by stopping both the irradiation of laser light L and spray of the heat amount adjusting agent 60 when the tip of the nozzle mechanism 87 reaches the region corresponding to a part of the heat amount adjusting agent supply-discharge passage 55. Then the heat amount adjusting agent 60 can be introduced easily into the hollow portion 50 through the heat amount adjusting agent supply-discharge passage 55. As for a sector mold 4 according to the sixth embodiment, a process of placing the sector mold 4 after the introduction of the heat amount adjusting agent 60 therein in a heating oven may be added to melti and then solidify the heat amount adjusting agent 60 to thereby introduce a product material 60A. Also, the manufacturing of a sector mold 4 according to the seventh embodiment can be done easily by using the master data for the tread-side mold 106 having the hollow portions 50A to 50E in positions corresponding to the land portions Q1 to Q5 of the tread T2. It is to be noted that the forming of the hollow portions 50A to 50E and the introduction of the heat amount adjusting agent 60 can be performed in the same way as with the sector mold 4 according to the second embodiment and others.

Heretofore, the present invention has been described with reference to a plurality of embodiments. However, the invention is not limited to those embodiments as described, but may include various combinations of the features thereof. For example, the arrangements described in the foregoing embodiments included the sector mold 4 as a tire curing mold for heating the crown region C1 of a tire T as an object to be heated and the formation of hollow portions 50 (50A, 50B, 50C, 50D, 50E) in the tread-side mold 106 for heating the tread T2 and the placement of the heat amount adjusting agent 60 therein. However, these arrangements may be applied to the lower side mold 2 and upper side mold 3 for heating the side regions S1 and S2, respectively, of the tire T as shown in FIG. 1.

And, by applying these arrangements, it is possible to give necessary and sufficient amounts of heat for appropriate degrees of curing in different regions of the tire T and the tread T2 in accordance with the gauge thicknesses or rubber types thereof. Accordingly, on completion of the curing process, a tire satisfying the design performances can be obtained by preventing the overcuring in some of the regions thereof. Furthermore, the arrangement of hollow portions for holding the heat amount adjusting agent can be applied to the molds for heating thermosetting resins. With the molds for heating articles made of thermosetting resin, it is possible to give appropriate amounts of heat to different regions of the thermosetting resin article by adjusting the presence or absence, position(s), and size of the hollow portions and the type of heat amount adjusting agent in accordance with the thickness and type of the thermosetting resin.

DESCRIPTION OF REFERENCE NUMERALS

1 curing apparatus
2 lower side mold
3 upper side mold
4 sector mold
10 bladder
50 (50A-50E) hollow portion
55 heat amount adjusting agent supply-discharge passage
60 heat amount adjusting agent
70 heat transfer assisting member
80 additive fabrication apparatus
85 scanning table
87 nozzle mechanism
100 tread curing apparatus
103 non-tread-side mold
106 tread-side mold

The invention claimed is:

1. A mold for transferring heat to an object to be heated comprising:
   a hollow portion provided inside the mold;
   a heat transfer assisting member disposed in the hollow portion; and
   a heat amount adjusting agent held in the hollow portion for changing a heat transfer property of the hollow portion;
   wherein the heat amount adjusting agent is made of a powdery or granular material having a material property different from that of the mold, and
   wherein the heat transfer assisting member is provided to be insertable and removable to and from the hollow portion.

2. The mold according to claim 1, wherein the heat amount adjusting agent is made of plural types of powdery or granular materials having material properties different from that of the mold.

3. The mold according to claim 1, wherein the heat amount adjusting agent is a product material produced by melting and then solidifying a powdery or granular material of a metal.

4. The mold according to claim 1, wherein a plurality of hollow portions are provided independently of each other.

5. The mold according to claim 1, wherein a cubic volume of the heat transfer assisting member is in a range from 5% to 50% of a capacity of the hollow portion.

6. The mold according to claim 1, wherein a heat amount adjusting agent supply-discharge passage communicating between the hollow portion and outside the mold is provided.

7. A tire curing mold for curing a tire by transferring heat to the tire, the mold comprising:
   a hollow portion provided inside the tire curing mold;
   a heat transfer assisting member provided in the hollow portion; and
   a heat amount adjusting agent held in the hollow portion for changing a heat transfer property in the hollow portion;
   wherein the heat amount adjusting agent is made of a powdery or granular material having a material property different from that of the tire curing mold, and
   wherein the heat transfer assisting member is provided to be insertable and removable to and from the hollow portion.

8. The tire curing mold according to claim 7, wherein the heat amount adjusting agent is of a metal.

9. The tire curing mold according to claim 7, wherein the heat amount adjusting agent is of a product material made by melting and then solidifying the powdery or granular material.

10. The tire curing mold according to claim 7, wherein the hollow portion is provided in a position inside of the tire curing mold and radially outside of a pattern forming surface of the tire curing mold.

11. The tire curing mold according to claim 7, wherein a plurality of hollow portions are provided independently of each other.

12. The tire curing mold according to claim 7, wherein a cubic volume of the heat transfer assisting member is in a range from 5% to 50% of a capacity of the hollow portion.

13. The tire curing mold according to claim 7, wherein a heat amount adjusting agent supply-discharge passage communicating between the hollow portion and outside the mold is provided.

* * * * *